United States Patent [19]

McCoy

[11] 4,159,362

[45] Jun. 26, 1979

[54] AQUEOUS SIZE COMPOSITION FOR GLASS FIBERS CONTAINING EPOXY RESIN, POLYETHYLENE GLYCOL MONOSTEARATE POLYVINYLPYRROLIDONE, METHACRYLOXYPROPYLTRIALKOXYSILANE AND A GLUCAN-CARBOXYMETHYL CELLULOSE MIXTURE

[75] Inventor: Richard A. McCoy, Gahanna, Ohio

[73] Assignee: Owens-Corning Fiberglas Corporation, Toledo, Ohio

[21] Appl. No.: 866,142

[22] Filed: Dec. 30, 1977

[51] Int. Cl.$^2$ .................... B32B 9/00; C08L 1/28
[52] U.S. Cl. .................... 428/391; 260/13; 260/17 R; 428/392
[58] Field of Search .................... 260/17 R; 428/391

[56] References Cited

U.S. PATENT DOCUMENTS

| | | | |
|---|---|---|---|
| 3,073,794 | 1/1963 | Stoner | 260/33.8 |
| 3,207,623 | 9/1965 | Marzocchi et al. | 428/391 |
| 3,262,809 | 7/1966 | Aber | 428/430 |
| 3,370,969 | 2/1968 | Powell et al. | 106/131 |
| 3,377,412 | 4/1968 | Franks | 264/78 |
| 3,391,052 | 7/1968 | Marzocchi | 428/273 |
| 3,434,914 | 3/1969 | Sterman et al. | 428/273 |
| 3,454,515 | 7/1969 | Hathwar | 260/29.6 |
| 3,484,333 | 12/1969 | Vanderbilt | 428/273 |
| 3,539,365 | 11/1970 | Durand et al. | 106/197 |
| 3,919,385 | 11/1975 | Smith | 264/184 |
| 4,014,726 | 3/1977 | Fargo | 428/391 |
| 4,049,597 | 9/1977 | Motsinger | 260/18 EP |
| 4,062,999 | 12/1977 | Kondo | 428/391 |
| 4,065,417 | 12/1977 | Wong | 260/17.4 CL |

OTHER PUBLICATIONS

Chem. Absts., vol. 71: 14254p, Wax Dispersion Containing $\beta$-1,4-Glucan, Belfort.
Chem. Absts., vol. 70: 58547v, Glass Fiber—Epoxy Resins, Eilerman et al.

*Primary Examiner*—Edward M. Woodberry
*Attorney, Agent, or Firm*—Philip R. Cloutier; John C. Purdue; James B. Wilkens

[57] ABSTRACT

An aqueous size composition is disclosed. The composition is particularly suited for application to glass fibers, and consists essentially of an emulsified epoxy resin, a gamma-methacryloxypropyltrialkoxy silane wherein the alkoxy group has from 1 to 3 carbons, a polyethylene glycol monostearate, a polyvinylpyrrolidone, a water dispersible powder of disintegrated beta-1,4-glucan material and sodium carboxymethyl cellulose dispersed therein and an organic acid in an amount sufficient to provide a pH from 3 to 6.

5 Claims, No Drawings

AQUEOUS SIZE COMPOSITION FOR GLASS FIBERS CONTAINING EPOXY RESIN, POLYETHYLENE GLYCOL MONOSTEARATE POLYVINYLPYRROLIDONE, METHACRYLOXYPROPYLTRIALKOXYSILANE AND A GLUCAN-CARBOXYMETHYL CELLULOSE MIXTURE

Glass fibers for use as a reinforcing material are drawn through small openings in a melting tank from a body of molten glass. Large numbers of individual filaments are gathered together to form a roving, strand or the like. Glass is an extremely abrasive material. As a consequence, absent some sort of protective coating, the individual filaments of a roving or the like abrade one another during ordinary handling. A protective coating, usually called a size, is usually applied to glass fiber filaments before they are gathered into a roving or the like in order to prevent such abrasion. Various sizing materials have been suggested for application to glass fibers to prevent or minimize abrasion, and for the further purpose of increasing adhesion between the filaments and a material, e.g., a synthetic resin or synthetic resinous composition, to be reinforced by the fibers. Various sizes for glass fibers have been suggested by the prior art.

The present invention is based upon the discovery of an improved size composition for glass fibers. The composition consists essentially of an emulsified epoxy resins, a gamma-methacryloxypropyltrialkoxy silane wherein the alkoxy group has from 1 to 3 carbons, a polyethylene glycol monostearate, a polyvinylpyrrolidone, a water dispersible powder of disintegrated beta-1,4-glucan material and sodium carboxymethyl cellulose dispersed in the composition and an organic acid in an amount sufficient to provide a pH from 3 to 6. It is usually preferred that the total solids content of the size composition according to the invention be from about 3 percent to about 7 percent, that the epoxy resin solids be from about 2 percent to about 4 percent, the glycol monostearate solids from about ½ percent to about 1¾ percent, and that the dispersible glucansodium carboxymethyl cellulose solids be from about 0.1 percent to about 0.5 percent. The preferred silane in the composition is gamma-methacryloxypropyltrimethoxy silane, and is preferably present in an amount ranging from about 10 percent to about 25 percent, based upon the epoxy resin solids.

The terms "percent" and "parts" are used herein, and in the appended claims, to refer to percent and parts by weight, unless otherwise indicated.

Sized, glass fiber roving or the like is also provided according to the present invention. Such roving or the like is produced by applying a size, as defined above, to glass fiber filaments as they are being gathered together in the production of roving, sliver, strand or the like, and curing the size, e.g. by heating for eighteen hours at a temperature of about 265° F. Preferably, the cured size constitutes from about ¼ to ¾ percent, based upon the weight of fiber and size.

The following Example, which is presented solely for the purpose of further illustrating and disclosing the invention, constitutes the best presently known mode for practice thereof.

EXAMPLE

An aqueous size composition according to the invention was prepared from 2.7 parts water dispersible powder of disintegrated beta-1,4-glucan material and sodium carboxymethyl cellulose, 42.8 parts emulsified epoxy resin, 0.19 part acetic acid, 4.85 parts gamma-methacryloxypropyltrimethoxy silane, 9.9 parts polyethylene glycol monostearate, 1.08 parts lubricant, 1.54 parts polyvinylpyrrolidone and 770 parts deionized water. The glucansodium carboxymethyl cellulose, the emulsified epoxy resin, the ethylene glycol monostearate, the lubricant and the polyvinylpyrrolidone are all subsequently identified.

Four premix tanks, each equipped with a comparatively high speed, propeller-type agitator which was operated to cause agitation of a premix produced therein were charged as follows:

Premixer No. 1

250 parts water followed by 2.7 parts glucansodium carboxymethyl cellulose.

Premixer No. 2

83 parts water followed by 42.8 parts emulsified epoxy resin.

Premixer No. 3

167 parts water followed by 0.19 part glacial acetic acid and 4.85 parts gamma-methacryloxypropyltrimethoxy silane, added with a metering bell at the rate of 2 parts per minute.

Premixer No. 4

50 parts water followed by 12.9 parts polyethylene glycol monostearate, 1.4 parts lubricant, 2 parts polyvinylpyrrolidone and 50 parts water. Premixer No. 4 was steam heated; the first charge of water was heated to 140° F. prior to the addition of the polyethylene glycol monostearate, the lubricant and the polyvinylpyrrolidone. When the organics were in solution, the second charge of water was added at a temperature of 75° F.

After the material in the first premixer had been agitated for fifteen minutes it was charged to a mixing tank having a slow speed (about 30 revolutions per minute) driven agitator extending across the bottom thereof, followed by 41½ parts rinse water. The contents of Premixer No. 2, after fifteen minutes of agitation, were then charged to the mixing tank, followed by 41½ parts rinse water. The contents of Premixer No. 3, after twenty five minutes of agitation, were then added to the mixing tank, followed by 41.5 parts rinse water, the contents of Premixer No.. 4 (following ten minutes of agitation after the second water addition) and a final 41½ parts addition of rinse water.

The resulting size was then applied to roving, as that roving was being formed with 4000 filaments, 0.0009 to 0.00095 inch in diameter. Such roving can be used to produce pultruded rods and the like shapes by a method where the roving passes through a resin impregnation tank, at least one shaping die and a curing oven, the motive force being applied by pullers which operate on the cured, reinforced rod or the like. The size constituted 0.6 percent, based upon the weight of sized fibers, after eighteen hours of curing at 265° F. The sized roving was found to produce rods having satisfactory flexural strength and electrical breakdown properties, and to eliminate problems that have been encountered with previously known rovings used in the pultrusion process, namely, color at turn-arounds, and showing in the finished product, variable wet-out, cracks in the finished product, loops in the finished product, variable dispersion and resin retention and fuzz on the roving. The size described above has also been applied to roving being formed from 4000 glass filaments ranging in diameter from 0.0006 to 0.00065 inch, and at a size-solids content of 0.5 percent, and can be applied to other glass fiber strand, roving and the like.

The specific epoxy resin used in the procedure described in the foregoing Example is commercially available from the Dow Chemical Company, Midland, Michigan, under the designation D.E.R. 337. This specific epoxy is an intermediate epoxide equivalent weight bisphenol-A semi-solid resin: epoxide equivalent weight about 278 and a specific gravity of about 1.16. The emulsion used in the foregoing Example was prepared from 4093 parts by weight of a 90 percent solution of the D.E.R. 337 epoxy in diacetone alcohol, 200 parts of a condensate of ethylene oxide with a hydrophobic base formed by condensing propylene oxide with propylene glycol*, 606 parts of a different condensate of ethylene oxide with a hydrophobic base formed by condensing propylene oxide with propylene glycol**, 409 parts xylene, 409 parts diacetone alcohol and 861 parts demineralized water. It has been found that neither the specific identity of the epoxy resin used in practicing the instant invention, nor that of the emulsion, is critical.

*The specific condensate used is commercially available from BASF Wyandotte under the trade designation L101.
**The specific condensate used is available from BASF Wyandotte under the designation P105.

The polyethylene glycol monostearate used in for foregoing Example was one where the polyethylene glycol had a nominal molecular weight of 400.

The particular polyvinylpyrrolidone employed is commercially available under the trade designation K90, while the lubricant is available from Emery Industries under the trade designation Trylube 7607, being a mineral oil mixed with at least one surfactant to make it water dispersible.

The water dispersible powder used in the procedure described in the foregoing Example is commercially available from FMC under the trade designation Avicel RC 591. It is produced from beta-1,4-glucan containing material and sodium carboxymethyl cellulose (see, for example, U.S. Pat. Nos. 2,978,446 and 3,539,365). The disintegrated beta-1,4-glucan containing material was produced by hydrolyzing cellulose, either natural or regenerated, for example by boiling for fifteen minutes in a 2.5 normal solution of hydrochloric acid, separating residue by filtration, washing to neutrality with water, and, finally, with a 1 percent solution of ammonium hydroxide to insure complete neutralization. The water dispersible powder is then produced by charging the neutralized wet filter cake from the hydrolysis process, for example at a solids content of about 40 percent and sodium carboxymethyl cellulose into a high speed paddle mixer where the paddles cause attrition of the solids by impact at high shear, introducing the effluent from the high speed paddle mixer into a second mixer where it is forced by an extruder through openings in plates and diluted gradually with water, and drying and grinding the effluent from the second mixer. The water dispersible powder can be made up of from about 85 to 95 parts of disintegrated beta-1,4-glucan containing material and from about 15 to 5 parts of sodium carboxymethyl cellulose having a degree of substitution of 0.75±0.15. Preferably, the dispersible powder is one which, when dispersed in water, forms a stable, thixotropic gel wherein at least 1 percent of the dispersed particles have a particle size not exceeding 1 micron.

It will be apparent that various changes and modifications can be made from the invention as described herein without departing from the spirit and scope thereof as defined in the appended claims.

What I claim is:

1. An aqueous size composition for glass fibers, said composition consisting essentially of an emulsified epoxy resin, a gamma-methacryloxypropyltrialkoxy silane wherein each alkoxy group has from one to three carbons, a polyethylene glycol monostearate, a polyvinylpyrrolidone, a water dispersible powder comprising about 85 to 95 parts by weight of disintegrated beta-1,4-glucan-containing material and from about 15 to 5 parts by weight of sodium carboxymethyl cellulose having a degree of substitution of 0.75±0.15, a lubricant and an organic acid in an amount sufficient to provide a pH from 3 to 6.

2. An aqueous size composition as claimed in claim 1 wherein the total solids content of the composition is from about 3 percent to about 7 percent, the epoxy resin solids are from about 2 percent to about 4 percent, the glycol monostearate solids are from about ¼ percent to about 1¾ percent and that glucan-carboxymethyl cellulose solids are from about 0.1 percent to about 0.5 percent, all proportions by weight.

3. An aqueous size composition as claimed in claim 2 wherein the silane is gamma-methacryloxy-propyl-trimethoxy silane, and said silane constitutes from about 10 percent to about 25 percent by weight based upon the epoxy resin solids.

4. A glass fiber produced by applying an aqueous size composition as claimed in claim 1 to the surface of a freshly drawn fiber and curing the size.

5. A glass fiber as claimed in claim 4 wherein the cured size constitutes from about one-fourth percent to about three-fourth percent by weight, based upon the weight of the fiber and the cured size.

* * * * *